(12) United States Patent
Saum et al.

(10) Patent No.: US 10,014,742 B2
(45) Date of Patent: Jul. 3, 2018

(54) DRIVE UNIT, ESPECIALLY AN ACTUATOR UNIT IN A VEHICLE

(71) Applicant: Robert Bosch GmbH, Stuttgart (DE)

(72) Inventors: Andreas Saum, Buehl (DE); Alexander Dudek, Offenburg (DE); Norbert Wegner, Buehl (DE); Richard Hurst, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 14/891,718

(22) PCT Filed: Mar. 31, 2014

(86) PCT No.: PCT/EP2014/056474
§ 371 (c)(1),
(2) Date: Nov. 17, 2015

(87) PCT Pub. No.: WO2014/183919
PCT Pub. Date: Nov. 20, 2014

(65) Prior Publication Data
US 2016/0099626 A1    Apr. 7, 2016

(30) Foreign Application Priority Data

May 17, 2013  (DE) .................. 10 2013 209 202

(51) Int. Cl.
*H02K 5/16*    (2006.01)
*H02K 5/173*   (2006.01)
*H02K 7/08*    (2006.01)
*B60S 1/08*    (2006.01)

(52) U.S. Cl.
CPC ............... *H02K 5/161* (2013.01); *B60S 1/08* (2013.01); *H02K 5/1732* (2013.01); *H02K 7/081* (2013.01)

(58) Field of Classification Search
CPC .... H02K 5/1732; H02K 5/1672; H02K 7/083; H02K 7/08
USPC ............................................. 310/90
See application file for complete search history.

(56) References Cited

U.S. PATENT DOCUMENTS 6,952,061 B2 * 10/2005 Mogi ................. H02K 5/1732
                                                     310/75 R
2003/0190103 A1    10/2003 Zaps
2006/0062505 A1 *  3/2006 Hoefs ................... F16F 1/324
                                                     384/517

FOREIGN PATENT DOCUMENTS

| CH | 240887 | 1/1946 |
|----|--------|--------|
| CN | 101340119 A | 1/2009 |
| CN | 202713033 U | 1/2013 |
| DE | 19804328 A1 | 8/1999 |
| DE | 102007043527 | 3/2009 |
| DE | 102009054720 | 6/2011 |

OTHER PUBLICATIONS

International Search Report for Application No. PCT/EP2014/056474 dated Jul. 23, 2014 (English Translation, 2 pages).

* cited by examiner

*Primary Examiner* — Thanh Lam
(74) *Attorney, Agent, or Firm* — Michael Best & Friedrich LLP

(57) ABSTRACT

A drive unit, especially an actuator unit in a vehicle, comprises an electric drive motor the motor shaft of which is rotatably mounted in bearings. A clamping ring is arranged in a housing and axially supports a bearing of the motor shaft.

11 Claims, 3 Drawing Sheets

DRIVE UNIT, ESPECIALLY AN ACTUATOR UNIT IN A VEHICLE

BACKGROUND OF THE INVENTION

The invention relates to a drive unit, especially to an actuator unit in a vehicle.

Drive units in vehicles which are used, for example, as wiper drives, window lifters, seat adjusters, etc. are known and have an electric drive motor which is coupled to a component to be displaced via a transmission. A windshield wiper for a vehicle, which has an electric wiper motor which is coupled via a transmission to an output shaft on which a wiper arm is located, is disclosed in DE 10 2009 054 720 A1. The motor shaft of the wiper arm has a worm which meshes with a worm gear of the transmission. Via a push rod and a crank the rotational movement of the worm gear is converted into a rotating oscillating movement of the output shaft.

For reasons of noise and wear, care has to be taken to keep the tolerances as low as possible in the transmission path between the motor shaft of the drive motor and the component to be moved.

SUMMARY OF THE INVENTION

The object of the invention is to design a drive unit by simple constructional measures such that the motor shaft of the drive motor is mounted in a manner with as little clearance as possible.

The drive unit according to the invention may be used as an electric small drive, preferably for systems in vehicles, for example as a wiper drive, as a window lifter or seat adjuster. The drive unit has an electric drive motor, wherein a transmission arranged downstream of the drive motor may be optionally present in the drive unit and the drive motor and transmission form a combined unit. The motor shaft of the electric drive motor is rotatably received in at least two bearings in a housing. One bearing is configured as a fixed bearing or a movable bearing with axial support on one side, for example by a stop on the motor shaft bearing against an inner bearing ring of the bearing. The bearing, for example as a tapered roller bearing or angular ball bearing, may be mounted on the motor shaft without clearance in an X- or O-arrangement. Moreover, a clamping ring is provided in the housing of the drive unit, said clamping ring axially supporting said bearing of the motor shaft relative to the housing. As the inner ring of the bearing is fixedly connected to the motor shaft in at least one axial direction, the clamping ring may act on the bearing with an axial force in this direction and thus axially support said bearing.

On the axially opposing side, the motor shaft is supported on the second bearing which in this axial direction is also configured either as a fixed bearing or movable bearing with axial support. This bearing, for example as a tapered roller bearing or angular ball bearing, may also be mounted on the motor shaft without clearance in an X- or O-arrangement. The axial force produced by the clamping ring forces the motor shaft against the second bearing and/or another stop, for example on the housing, and thereby prevents axial clearance of the motor shaft. The clamping ring represents a component of structurally simple design which is inserted into the housing and acts on the motor shaft via the bearing. The clamping ring does not act directly on the motor shaft but only indirectly via the bearing so that no friction is produced by direct contact between the motor shaft and the clamping ring.

According to an advantageous embodiment, the clamping ring is axially displaceably received in a receiver space in the housing. When mounting the drive unit, this initially permits the motor shaft to be inserted into the housing and subsequently permits the clamping ring to be displaced axially in the direction of the bearing until the motor shaft is displaced by the mounting force into an axial position in which the axial clearance of the motor shaft is eliminated. The clamping ring in this case is advantageously forced axially against the bearing with a defined mounting force. In the final position, the clamping ring which is supported in the housing exerts an axial force onto the bearing and thus also onto the motor shaft.

According to a further advantageous embodiment, the receiver space is located in a transmission housing of a transmission, which together with the electric drive motor forms the drive unit and is driven by the drive motor. A worm which meshes with a worm gear of the transmission may be located on the motor shaft, wherein the worm gear motion is able to be transmitted via further transmission components, for example a crank or a rocker. In this manner, for example, a wiper drive may be produced with a rotating oscillating motion of an output shaft on which a wiper arm is located. The worm on the motor shaft is located on the portion of the motor shaft which is located outside the motor housing and protrudes through a central recess in the clamping ring.

According to a further advantageous embodiment, the clamping ring comprises clamping tabs which axially support the front face of the bearing. The clamping tabs are located adjacent to a clamping portion arranged on the peripheral face, said clamping portion for example being designed to be bent back in the manner of a speed nut and to have an axial and a radial directional component. Via the clamping portion, the clamping ring in the housing is radially secured and supported on the inner walls of the receiver space. The clamping tabs arranged adjacent to the clamping portion are either located opposite the clamping portion radially inwardly offset on the clamping ring or, according to an alternative embodiment, radially level with the clamping portion but in through-holes which are incorporated in the clamping portion.

Advantageously, the clamping tabs act on an outer bearing ring of the bearing which is mounted via balls on the inner bearing ring, whereas the inner bearing ring which sits on the motor shaft is not acted upon by the clamping ring. However, a reverse design is also possible in which only the inner bearing ring is acted upon by the clamping ring, and not the outer bearing ring, or, according to a further alternative, in which both the inner bearing ring and the outer bearing ring are acted upon by the clamping ring.

Via the clamping portion on the peripheral face the clamping ring is axially secured on the inner walls of the receiver space in the housing. The clamping tabs bear with tension against the bearing and transmit an axial force to the bearing and the motor shaft.

The clamping ring advantageously consists of sheet metal and/or metal. The clamping portion and the clamping tabs are preferably configured integrally with the clamping ring.

BRIEF DESCRIPTION OF THE DRAWINGS

Further advantages and expedient embodiments may be derived from the further claims, the description of the figures and the drawings, in which:

The same components are provided with the same reference numerals in the figures.

DETAILED DESCRIPTION

Figure 1:
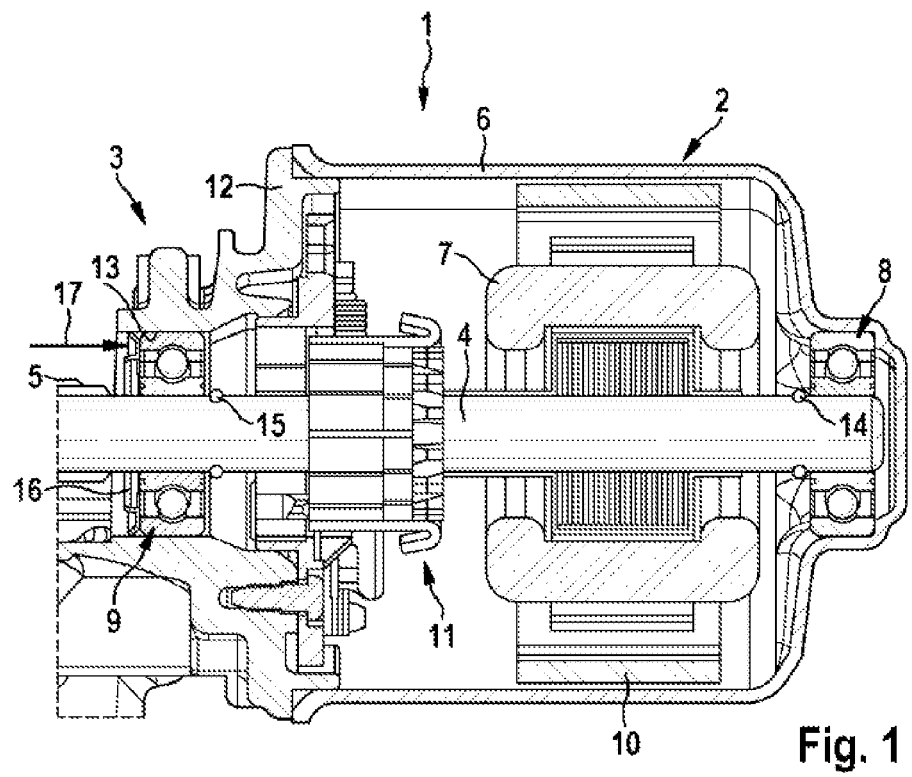
FIG. 1 shows a section longitudinally through a drive unit.
Figure 2:
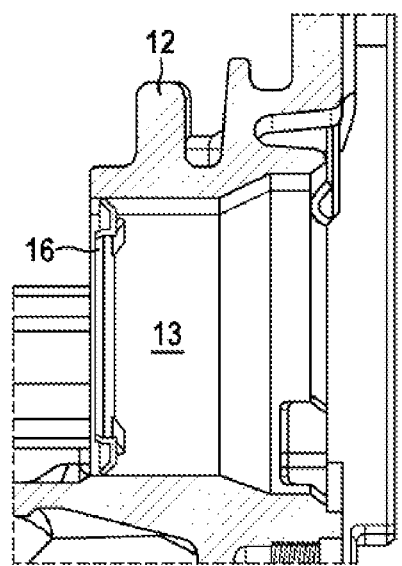
FIG. 2 shows a receiver space for receiving a clamping ring in a transmission housing of a transmission which is part of the drive device.

In FIG. 1 a drive unit 1 is shown, said drive unit comprising an electric drive motor 2 and a transmission 3. The drive unit 1 may be used as an actuator unit in motor vehicles, for example as a windshield wiper device, as a window lifter or for seat adjustment. The motor shaft 4 of the drive motor 2 is a carrier for a worm 5 which meshes with a worm gear of the transmission 3 and thereby transmits the drive motion of the motor to an output shaft.

The drive motor 2 is configured as a permanently excited synchronous motor and, in a motor housing 6 which forms a pole casing, comprises an armature 7 with coils which may be supplied with current on the motor shaft 4 which is rotatably mounted in bearings 8 and 9. Permanent magnets 10 are arranged on the inner face of the motor housing 6, the field of the coils in the armature 7 cooperating with the magnetic field thereof. The coils in the armature 7 are supplied with current via a commutating device 11.

The first bearing 8 and the second bearing 9 are respectively configured as movable bearings and supported axially via a stop 14 and/or 15 on the motor shaft 4, in each case in the direction of the armature 7 located therebetween. On the side opposing the stop 15, the bearing is axially secured by a clamping ring 16 which is inserted into the receiver space 13 in the transmission housing 12 and subjects the outer bearing ring of the bearing 9 to force, axially in the direction of the armature 7. Via the clamping ring 16 and the bearing 9, an axial force acts on the motor shaft 4 which forces the motor shaft 4 in the direction of the base of the housing of the motor housing 6. Due to the stop 14 which is assigned to the first bearing 8, however, the axial actuating motion of the motor shaft 4 is limited; via the clamping ring 16, therefore, an axial bearing clearance of the motor shaft 4 may be eliminated. The clamping force which is produced by the clamping ring 16 is transmitted via the bearing 9 to the motor shaft 4 and therefrom to the further bearing 8 which is axially supported on the base of the motor housing 6.

For mounting the drive unit 1, the drive motor 2 with its motor housing 6 is connected to the transmission housing 12 of the transmission 3. The clamping ring 16 is pushed onto the motor shaft 4 and inserted into the receiver space 13 in the transmission housing 12 according to the arrow 17 (FIG. 1). The clamping ring 16 in this case acts on the outer bearing ring of the bearing 9 with an axial force which is oriented toward the armature 7. The mounting takes place with a defined axial force which is sufficient in order to eliminate clearance and/or tolerances, for example clearance in the ball bearings of the bearings 8 and 9 and longitudinal tolerances.

Figure 3:
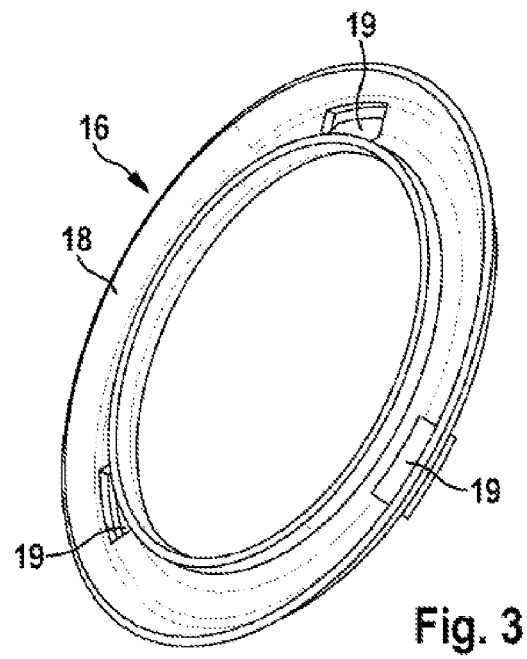
FIG. 3 shows a clamping ring in a perspective view.

In FIG. 3 a clamping ring 16 is shown in a first variant. The clamping ring 16 has on its radially external face a peripheral clamping portion 18 which is designed to be bent back and which has an axial and radial directional component. The external clamping portion 18 is, for example, bent back at an angle of ca. 45° relative to the plane of the clamping ring. The clamping portion 18 is designed integrally with the clamping ring 16.

Immediately adjacent, but radially inwardly offset to the clamping portion 18, the clamping ring 16 comprises three clamping tabs 19 which are evenly distributed over the periphery and which are also configured integrally with the clamping ring 16 and rise above the clamping ring plane. The clamping tabs 19 in the mounted state are located on the outer bearing ring of the bearing 9 and act on the bearing 9 with an axial force.

Figure 4:
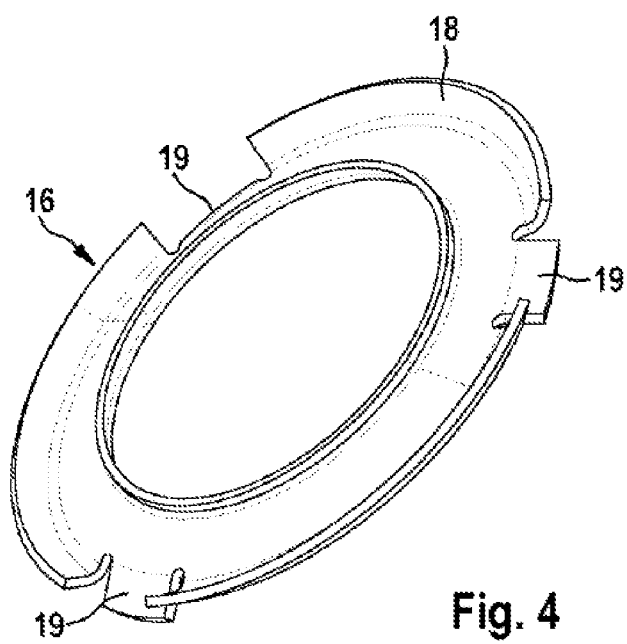
FIG. 4 shows a clamping ring in another embodiment.

In FIG. 4 the clamping ring 16 is shown in a further variant. The clamping portion 18 arranged on the outer periphery has through-holes in which the clamping tabs 19 are arranged, said clamping tabs therefore being located radially at the same height as the clamping portion 18. In both exemplary embodiments, according to FIGS. 3 and 4, the clamping tabs 19 protrude over a front face of the clamping ring and the clamping portion 18 protrudes over the opposing front face of the clamping ring.

Figure 5:
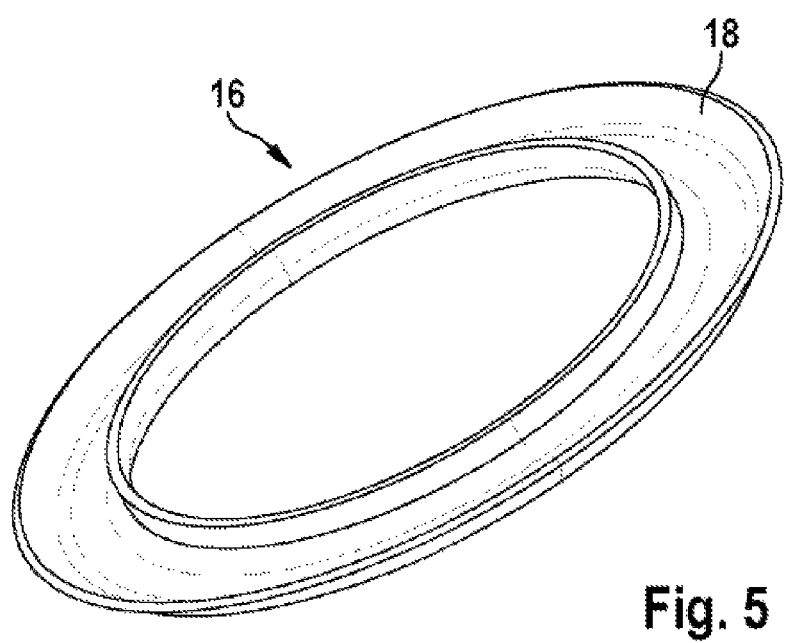
FIG. 5 shows a clamping ring in yet another embodiment.

In FIG. 5 a clamping ring 16 is shown with a clamping portion 18 arranged on the outer periphery, said clamping portion being designed to be continuous, i.e. without through-holes. The clamping ring 16 is configured without clamping tabs and/or spring tabs. In the mounted state, the front face of the clamping ring 16 bears against the bearing of the motor shaft and axially supports the bearing.

The invention claimed is:

1. A drive unit, comprising an electric drive motor (2), a motor shaft (4) thereof being rotatably received in a first bearing (9) and a second bearing (8), and the drive unit also comprising a clamping ring (16) which is arranged in a housing and which axially supports the first bearing (9) of the motor shaft (4), characterized in that the clamping ring (16) is axially displaceably received in a receiver space (13) in the housing, and in that a peripheral face of the clamping ring (16) comprises a clamping portion (18) that bears against an inner wall of the receiver space (13) in the housing and is configured to be resilient such that a clamping force that emanates from the clamping ring (16) is transmitted via the first bearing (9) on the motor shaft (4) and from the motor shaft (4) to the second bearing (8).

2. The drive unit as claimed in claim 1, characterized in that the housing having the receiver space (13) is a transmission housing (12) of a transmission (3) which is arranged downstream of the drive motor (2).

3. The drive unit as claimed in claim 1, characterized in that the clamping ring (16) comprises clamping tabs (19) which axially support a front face of the first bearing (9).

4. The drive unit as claimed in claim 3, characterized in that the clamping tabs (19) are arranged immediately adjacent to the clamping portion (18).

5. The drive unit as claimed in claim 4, characterized in that the clamping tabs (19) are offset radially inwardly relative to the clamping portion (18).

6. The drive unit as claimed in claim 5, characterized in that the clamping portion (18) is configured to be peripheral.

7. The drive unit as claimed in claim 4, characterized in that the clamping tabs (19) are arranged radially outwardly on the clamping ring (16) in through-holes which are incorporated in the clamping portion (18).

8. The drive unit as claimed in claim 1, characterized in that the first bearing (9) has an inner bearing ring located on the motor shaft (4) and an outer bearing ring, and the clamping ring (16) acts on the outer bearing ring.

9. The drive unit as claimed in claim 1, characterized in that the motor shaft (4) axially penetrates the clamping ring (16) and drives a transmission component.

10. The drive unit as claimed in claim 1, characterized in that the first bearing (9) has an X- or O-arrangement.

11. A windshield wiper device in a vehicle comprising a drive device (1) as claimed in claim 1.

* * * * *